US011044159B2

(12) United States Patent
Gazzetti et al.

(10) Patent No.: US 11,044,159 B2
(45) Date of Patent: Jun. 22, 2021

(54) APPLICATION-LEVEL, COOPERATIVE MINIMIZATION OF OFFLINING INCIDENTS IN AN INTERNET OF THINGS (IOT) ENVIRONMENT

(71) Applicant: INTERNATIONAL BUSINESS MACHINES CORPORATION, Armonk, NY (US)

(72) Inventors: Michele Gazzetti, Dublin (IE); Yiannis Gkoufas, Dublin (IE); Konstantinos Katrinis, Dublin (IE); Andrea Reale, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 85 days.

(21) Appl. No.: 15/916,489

(22) Filed: Mar. 9, 2018

(65) Prior Publication Data
US 2019/0280932 A1 Sep. 12, 2019

(51) Int. Cl.
*H04L 12/24* (2006.01)
*H04W 4/70* (2018.01)
*H04W 24/02* (2009.01)
*H04L 12/26* (2006.01)
*H04L 29/08* (2006.01)

(52) U.S. Cl.
CPC ...... *H04L 41/0893* (2013.01); *H04L 41/0823* (2013.01); *H04L 41/0896* (2013.01); *H04L 43/0829* (2013.01); *H04L 43/0894* (2013.01); *H04W 4/70* (2018.02); *H04W 24/02* (2013.01); *H04L 41/5003* (2013.01); *H04L 43/0817* (2013.01); *H04L 67/10* (2013.01)

(58) Field of Classification Search
CPC ............. H04L 41/0893; H04L 41/0896; H04L 43/0894; H04L 43/0817; H04L 67/10; H04W 4/70; H04W 24/02
See application file for complete search history.

(56) References Cited

U.S. PATENT DOCUMENTS

| 2013/0132559 | A1* | 5/2013 | Kotecha | ............... H04L 43/16 709/224 |
| 2013/0298118 | A1 | 11/2013 | Sharma et al. | |
| 2017/0187597 | A1 | 6/2017 | Nolan et al. | |
| 2017/0187642 | A1* | 6/2017 | Nolan | .................. H04W 4/70 |

(Continued)

OTHER PUBLICATIONS

Ryu et al., "Timescale Decoupled Routing and Rate Control in Intermittently Connected Networks," IEEE/ACM Transactions on Networking, vol. 20, No. 4, Aug. 2012 (14 pages).

(Continued)

*Primary Examiner* — Tonia L Dollinger
*Assistant Examiner* — Jihad K Boustany
(74) *Attorney, Agent, or Firm* — Griffiths & Seaton PLLC

(57) ABSTRACT

Embodiments for optimization of storage and network usage in an Internet of Things (IoT) environment by a processor. A data stream production rate for one or more applications may be dynamically adjusted based on current network conditions, a network status forecast, storage availability, network disruption patterns, quality of service (QoS) policies, application or network priorities, or a combination thereof to reduce data loss at a locality caused by network disruption in the IoT computing environment.

11 Claims, 9 Drawing Sheets

(56) References Cited

U.S. PATENT DOCUMENTS

2018/0083882 A1\* 3/2018 Krishan ............. H04L 47/2433
2018/0332503 A1\* 11/2018 Olson .................... H04L 43/10
2018/0375915 A1\* 12/2018 Sridhar .............. H04L 41/5067

OTHER PUBLICATIONS

Rivera et al., "A Mechanism for Matching Application Message Generation With Wireless Network Performance," IEEE Radio and Wireless Conference, RAWCON'98 Proceedings, 1998 (4 pages).

\* cited by examiner

APPLICATION-LEVEL, COOPERATIVE MINIMIZATION OF OFFLINING INCIDENTS IN AN INTERNET OF THINGS (IOT) ENVIRONMENT

BACKGROUND OF THE INVENTION

Field of the Invention

The present invention relates in general to computing systems, and more particularly to, various embodiments for optimization of storage and network usage in an Internet of Things (IoT) environment using a computing processor.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. The amount of information to be processed nowadays increases greatly. However, often times computing systems may experience temporary communication or network disruption that impacts the processing, storing, communicating, or handling of data. Therefore, processing, storing, communicating, or handling of data during a network disruption is a key problem to solve.

SUMMARY OF THE INVENTION

Various embodiments for application-level, cooperative minimization of offlining incidents in an Internet of Things (IoT) environment by a processor, are provided. In one embodiment, by way of example only, a method for optimization of storage and network usage in an Internet of Things (IoT) environment, again by a processor, is provided. A data stream production rate for one or more applications may be dynamically adjusted based on current network conditions, a network status forecast, storage availability, network disruption patterns, quality of service (QoS) policies, application or network priorities, or a combination thereof to reduce data loss at a locality caused by network disruption in the IoT computing environment.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
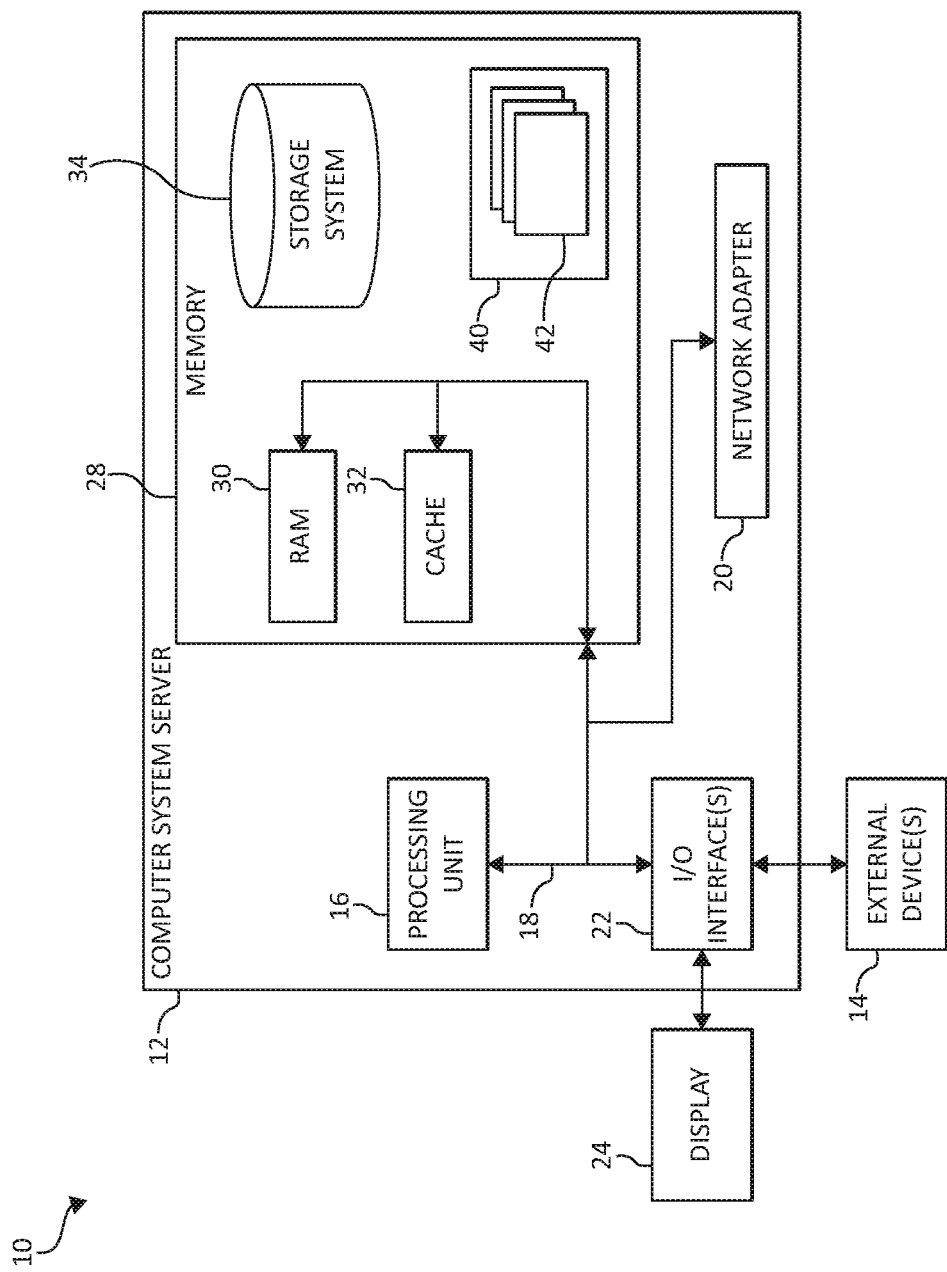
FIG. 1 is a block diagram depicting an exemplary cloud computing node according to an embodiment of the present invention.

Computing systems may include various applications that produce one or more data streams. Data stream producing applications are becoming increasingly relevant in many growing businesses, government, and educational scenarios (e.g., Internet of Things "IoT", financial, distributed transaction process, and the like). These applications are often part of larger distributed systems made of components spread across a Wide Area Network ("WAN") (e.g., applications running on local infrastructure sending data to the Cloud for global coordination, processing or archival needs). As mentioned previously, often times these computing systems such as, for example, a networked computing system that may include cloud storage, may experience temporary communication or network disruptions that impact processing, storing, communicating, or handling of data. Data loss during a temporary network disruption event such as, for example, WAN disruptions (e.g., loss of connectivity or bandwidth degradation) can produce computing inefficiency and a costly financial impact.

To prevent data loss, current systems rely on local (primary or secondary) storage to buffer during disruptions, however, long disruptions and steady data rates can deplete storage quickly. This problem is exacerbated in situations where the storage capacity is relatively limited (e.g., mobile devices or embedded devices in IoT/Edge scenarios). For example, in the event of lost network connectivity, message brokers responsible for delivering data streams over the wide area network ("WAN") rely on primary or secondary memory storage to buffer data until connectivity is restored. However, there are two main limitations: 1) current systems do not leverage application-level opportunities to adapt the data rate of the system to the current network and storage conditions; and 2) current systems are unable to optimize considering as a whole the requirements of the applications running in a locality as an ensemble.

Being able to optimize the use of storage in a locality and network for reliability during disruptions according to application-driven semantics can mitigate or otherwise avoid the problem. Accordingly, mechanisms of the illustrated embodiments provide a solution for application-level, cooperative minimization of offlining incidents in an Internet of Things (IoT) environment (e.g., an edge or cloud computing environment). A data stream production rate for one or more applications may be dynamically adjusted based on current network conditions, a network status forecast, storage availability, network disruption patterns, quality of service (QoS) policies, application or network priorities, or a combination thereof to reduce data loss at a locality caused by network disruption in the IoT computing environment. In one aspect, messages may be aggregated together and regulate data stream production rate to more efficiently utilize the resources in the locality.

In one aspect, the present invention relates to optimization of storage and network usage by a set of applications that run in a "tightly connected locality" (e.g., a local area network) and that produce continuous streams of data that need to be shipped or sent outside the locality over an intermittent and/or unstable network. The present invention provides the optimization by improving reliability in accordance to application-specific semantics. In one aspect, the present invention monitors the production rate of data streams to be shipped outside the locality and produced by a set of applications distributed across the locality. The condition of the network going outside the locality and the availability of storage space inside the locality may also be monitored.

Additionally, the mechanisms of the illustrated embodiments may decide, based on monitoring data and one or more user-provided policies, data production rates for each of the application data streams in order to minimize data loss caused by network disruption (total or partial disruptions). Applications that produce one or more data streams may be notified of one or more recommended data rates. These applications may also be provided an option to adapt data production rates according to internal semantics of the applications. The present invention may also be applied to IoT/Edge applications that continuously upload data to a cloud storage environment despite intermittent/unstable WAN network connectivity.

As will be further described, the present invention may allow applications to adapt data production rates based on storage availability, historical knowledge of network disruption patterns, and on selected quality of service (QoS) policies and priorities provided by the application, administrators, or a combination thereof. Moreover, the application-level system may determine and recommend data production rates for each data stream produced within the locality. The present invention may include a mechanism to feed back the determined recommendations for data production rates to applications via control messages. Using the recommended data production rates, one or more applications may adapt a current data stream production rate to the recommended data production rates (e.g., adapted data production rate) according to one or more parameters, rules, policies, and/or internal semantics (e.g., the applications may choose a slower data sampling period, the applications may choose to send windowed averages rather than single data points, or the applications may selectively filter out less important data points in favor of more important ones). As such, the present invention enables each application to use the available network or storage resources according to a computed quota for each application. One or more data points for data streams that exceed the quota may be dropped in accordance to the provided policies and priorities.

Additionally, the present invention provides a system for application-level control messages to the applications running in a given locality and shipping data to a second locality, where the two localities are connected via an unreliable and possibly unstable network link. In one aspect, cooperation is enabled between devices deployed in a locality that, in case of missing connectivity with remote services, minimizes the amount of data lost. The mechanisms of the present invention may calculate (sub)optimal production rates for applications based on (i) current network status, (ii) forecast on network status, (iii) current offlining (storage) capacity at the application locality, and (iv) application level QoS policies, in order to minimize information loss at the locality. In so doing, the present invention enhances the level of coordination between devices and informs one or more applications about the current state of the recourses in the location.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
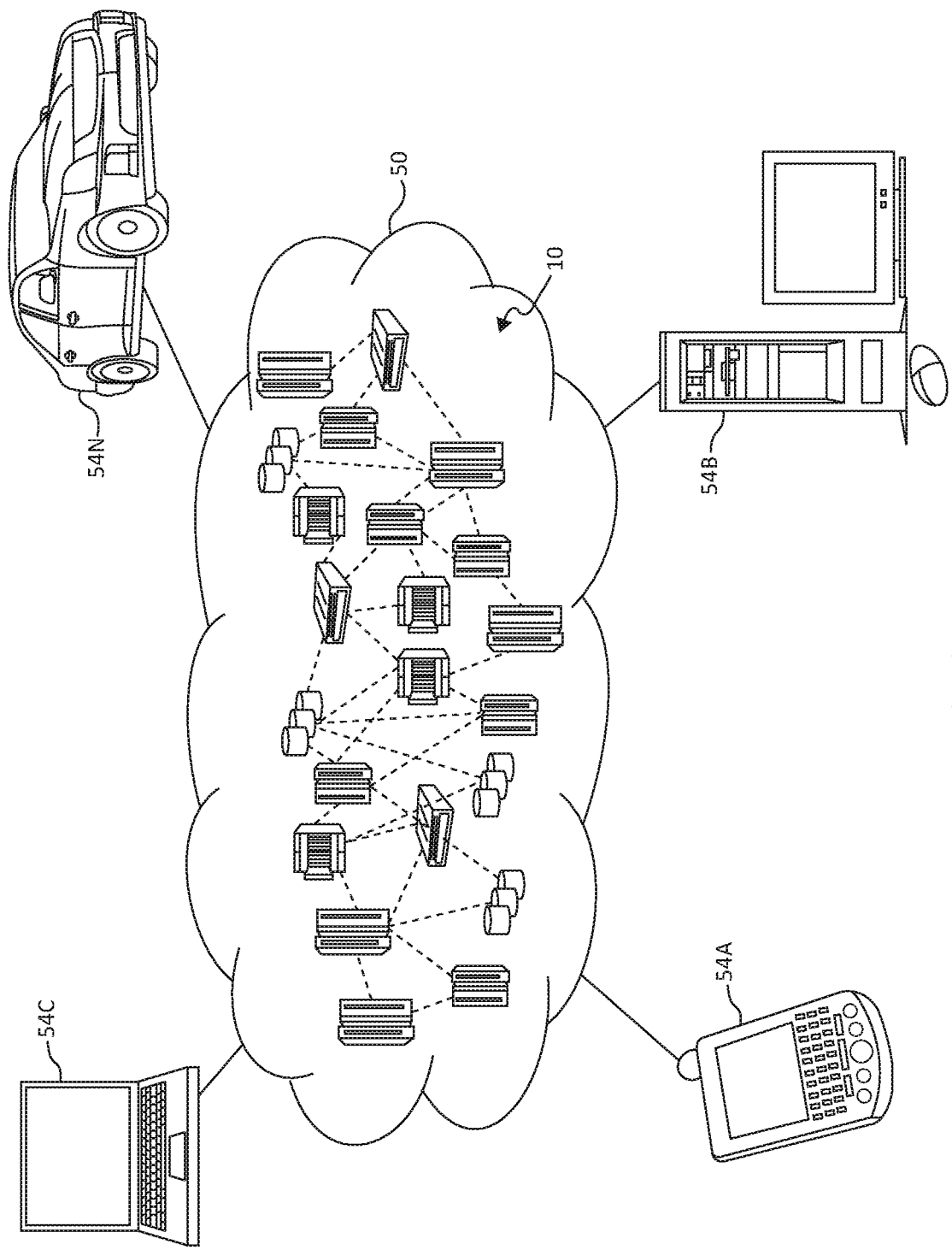
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
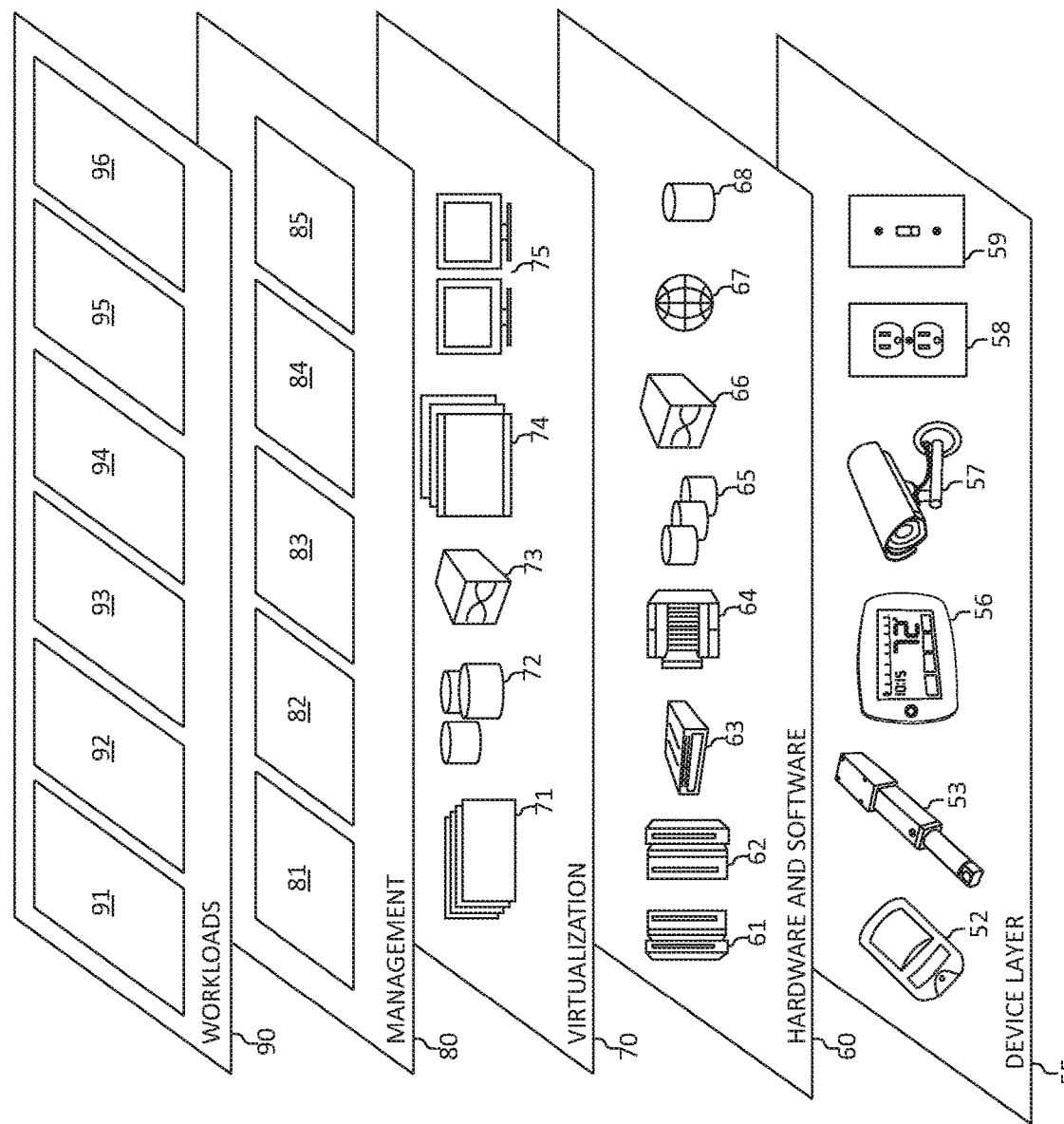
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for optimization of storage and network usage. In addition, workloads and functions 96 may include optimization of storage and network operations, and as will be further described. One of ordinary skill in the art will appreciate that the workloads and functions 96 for optimization of storage and network usage may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As described herein, the present invention solves the challenge of adaptation of optimization of storage and network usage by enabling applications to adapt or adjust data production rates based on current network conditions, on storage availability, on historical knowledge of network disruption patterns, and on QoS policies and priorities provided by application or infrastructure owners, and/or a combination thereof. One or more priorities for how an application should use network and storage resources may be defined and/or enforced among the data streams produced in a locality. The applications may be allowed to learn, determine, and/or know current data production rates that may satisfy the one or more policies in the current network/storage conditions (also based on historical data), while being provided the opportunity to adapt data production rates to a recommended production rate.

In one aspect, current network capacity, the current storage availability, and the current data streams rate may be monitored. The historical network conditions may be recorded and a model may be provided to predict future duration of network disruptions. One or more QoS indications may be accepted based on relative and absolute priorities between the applications produced in a locality. An example of relative priority (or "proportional priorities") may be that given three applications A, B, and C, the total amount of storage and/or network resources available may be represented as 100%. Application A may be provided with 70%, application B may be provided with 20% and application C may be provided with 10%. With such QoS priorities, application A may be allowed to use up to 70% of the resources, and so on and so forth. An example of absolute priorities may be that given three applications A, B, and C, an absolute priority number may be assigned to each application where a larger or increasing number means higher priority. For example, assume that application A is assigned an absolute priority number of 3, application B is assigned an absolute priority number of 2, and application C is assigned an absolute priority number of 1. Application A will be the application with the highest priority. This means that application A will be given priority to use as many resources as it needs or is required. After application A is satisfied, application B can use as much of the leftover storage and/or network resources as it needs or requires, and Application C may use whatever is leftover after application B.

As such, the present invention provides as output the recommended data rates for each data stream so as to satisfy the network and storage capacity constraints, while fulfilling the QoS policies and priorities. In an additional aspect, based on the output of the recommended data rates, one or more messages may be sent to applications informing the application of the recommended data rates for each stream produced by the application in order to provide each application the option to adapt current data production rates to the recommended data production rates.

Figure 4:
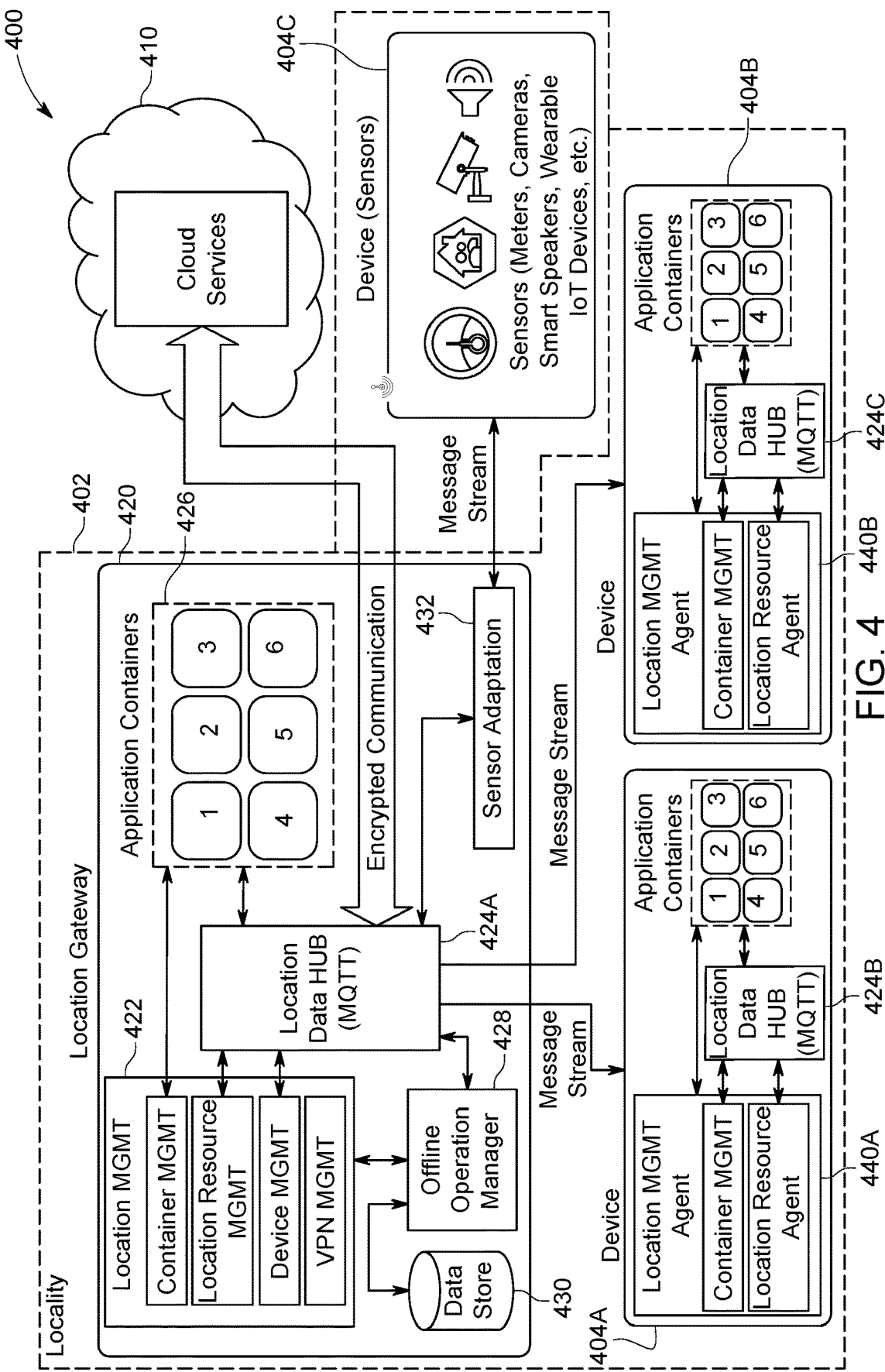
FIG. 4 is an additional block diagram depicting various user hardware and cloud computing components functioning according to an embodiment of the present invention.

Turning now to FIG. 4, a block diagram depicting exemplary functional components 400 according to various mechanisms of the illustrated embodiments is shown. Computer system/server 12 of FIG. 1 may be employed in FIG. 4, incorporating processing unit 16 to perform various computational, data processing and other functionality in accordance with various aspects of the present invention.

The functional components 400 may include a locality 402 and a cloud computing environment 410. The locality 402 may include a location gateway 420, and be associated with one or more devices such as, for example, devices 404A-C. In one aspect, the devices 404A-C may also be an alternative location gateway 420 or "locality." Additionally, the devices 404A-C may also be a sensor device (e.g., an IoT sensor device) such as, for example, meters, cameras, smartphones, speakers, wearable IoT devices, computers, and the like. Additionally, the devices 404A-C may be a general or special purpose computing device with networking capabilities. That is, devices 404A-C may have either general or special purpose processors (e.g., a computer, an embedded general-purpose system-on-a-chip, and/or a sensor) as used herein.

The locality 402 may include one or more devices such as, for example, 404A-C interconnected with each other (e.g., such as devices that form a local area network "LAN"). Devices 404A-C may connect to a wide-area communication network or "Internet" through one or more designated gateways. The communication between devices and the gateway(s) (and eventually through the gateway to the cloud) is in the form of discrete, asynchronous communication (e.g. publish/subscribe). In one aspect, by way of example only, examples of locality may include: a fleet of devices in a remote location (e.g. oil rig, manufacturing plant), and/or end devices (e.g., IoT devices) in a smart home.

Also, the locality 402 may include the location gateway 420. The location gateway 420 may include a location management ("MGMT") device 422 that includes one or more container MGMTs, a location resource MGMT, a device MGMT, and/or a virtual private network ("VPN") MGMT. The location gateway 420 may also include an offline operation manager 428, a data store 430, a sensor adaption device 432, and/or application containers 426 (which may contain one or more various types of applications such as, for example, applications 1-6), and/or a location data hub 424A (e.g., MQTT).

In an additional aspect, the devices 404A-C may include a location MGMT agent (e.g., an application) such as, for example, location MGMT agent 440A, 440B. The location MGMT agents 440A, 440B may include a container MGMT, a location resource agent, location data hub 424B, 424C ("MQTT"), and/or an application container (which may also contain one or more various types of applications such as, for example, applications 1-6). Alternatively, the devices 404A-C such as, for example, device 404C may be a sensor device or IoT sensor device (e.g., meters, cameras, smartphones, speakers, wearable IoT devices, computers, and the like).

In one aspect, the location gateway 420 may send one or more message streams (e.g., data streams) to one or more devices 404A-C, which may be communicated via the location data hub 424A. Also, the location data hub 424A may communicate to and/or receive, from the cloud computing environment 410, one or more encrypted communications.

It should be noted that, as used herein, a message may be a bounded sequence of bytes that can be routed through a local or the external network. A data stream may be a logically unbounded sequence of messages with each message containing one data point. Each data stream (as the entire stream) may be identified by a unique name or identifier. An application may be a producer of one or more data streams running on one or more devices.

Figure 5:
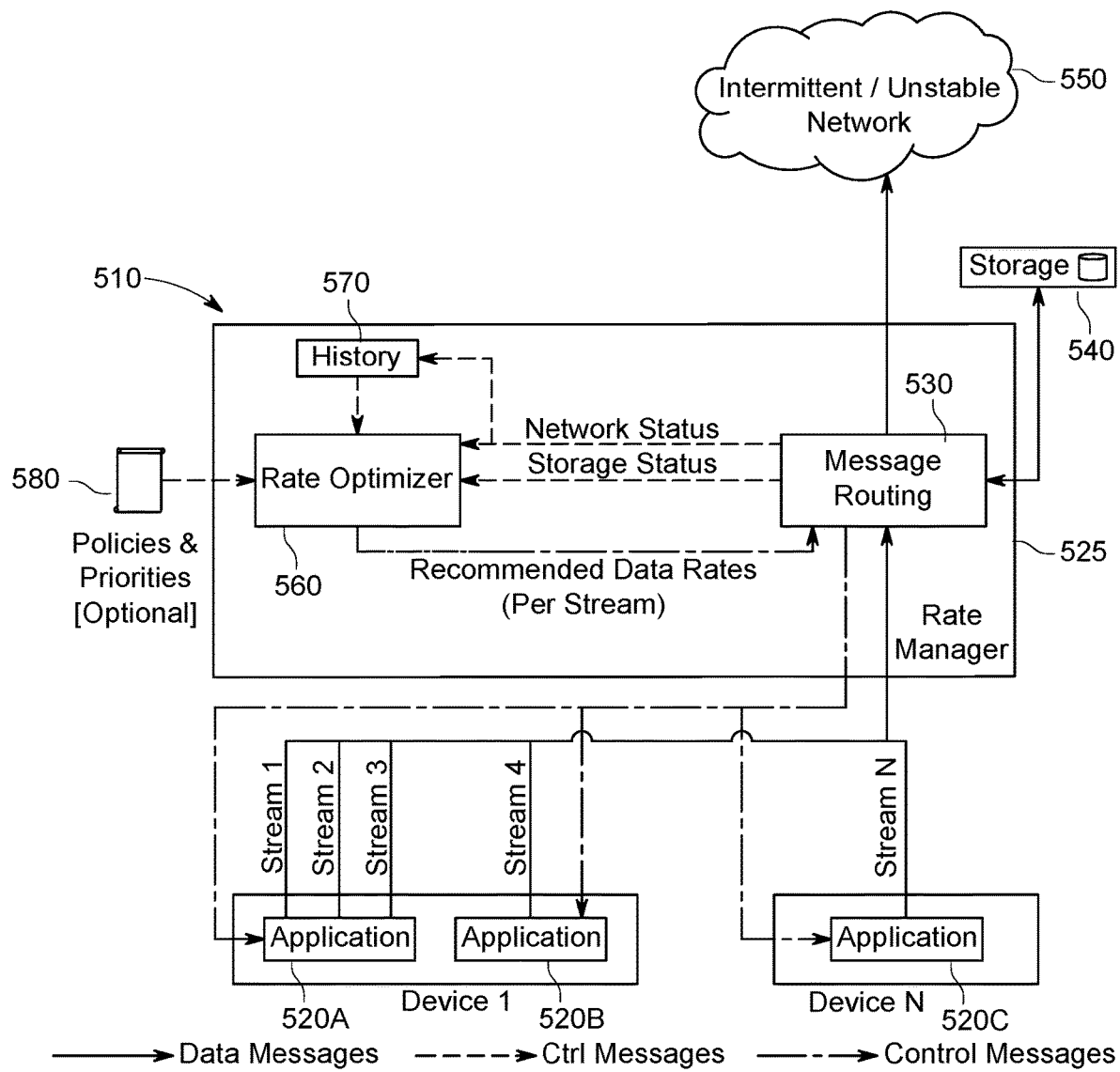
FIG. 5 is an additional block diagram depicting an exemplary system architecture in an Internet of Things (IoT) environment according to an embodiment of the present invention.

Turning now to FIG. 5, a block diagram of exemplary functionality 500 relating to application-level, cooperative minimization of offlining incidents in a wide area network ("WAN) and/or in an Internet of Things (IoT) environment is depicted. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-4. With the foregoing in mind, the module blocks 500 may also be incorporated into various hardware and software components of a system for use of virtual sensor models in an IoT environment in accordance with the present invention. Many of the functional blocks 500 may execute as background processes on various components, either in distributed computing components, or on the user device, or elsewhere.

One or more physical devices (e.g., devices 1-N) may be connected to a locality 510 and execute one or more applications such as, for example, applications 520A-C. A rate manager 525 may be included in the locality 510 and may include a rate optimizer 560 and a message router 530.

One or more of the devices 1-N may send or receive one or more messages (e.g., data messages, control messages, etc.) to a message routing device. The applications 520A-C executing on the devices 1-N may be a software and/or hardware component running (or part of) a device (e.g., device 1-N) that produces one or more data streams (e.g., streams 1-N) and is able to receive coordination messages. The message routing 530 (e.g., message routing component 530) may be included in rate manager 525 and the locality 510. The message routing 530 may be a logical component (e.g., centralized or distributed) that may monitor the status of an external network 550 (e.g., an intermittent/unstable network) and the storage of the locality 510. The message routing component 530 may receive data streams from the applications 520A-C. The message routing component 530 may route the data streams to an external network 550 or hold them on the storage 540 to accommodate for network disruption. The storage 540 may be either distributed or centralized storage available at the locality 510. The message routing component 530 may enforce data rate recommendations by dropping exceeding messages from violating data streams (e.g., streams 1-N). The message routing component 530 may also monitor the current data rate of each data stream in the locality.

The locality 510 may also determine the external network 550 is an intermittent/unstable network. A network infrastructure (e.g., a WAN) may connect the locality 510 to the destination (e.g., devices 1-N) of the data streams. A rate optimizer 560 (e.g., a rate optimizer component) may be responsible for generating and propagating recommended data production rates for each of the data streams produced in the locality. The rate optimizer component 560 takes as input: a) a current network status, b) a current storage status, c) current streams data rates, predictions about the durations of disruptions (e.g., network disruptions) from the historical component, and/or d) one or more policies and priorities 580 (e.g., QoS polices and priorities) provided externally by the infrastructure owner. A historical component 570 ("history") may receive the history of network disruptions and model the disruptions in order to provide predictions about the duration of ongoing disruptions.

It should be noted that as used herein, QoS policies and priorities may be defined. For example, a user, administrator, and/or an infrastructure owner may optionally express policies to determine how resources would be partitioned among the applications (and the outgoing streams of the applications) running in the locality. In one aspect, absolute priorities may be expressed through an increased priority number associated with applications and/or individual data streams. Resources may be first allocated starting from data streams with higher priority and then allocated to data streams with lower priority. In an additional aspect, QoS policies and priorities may be using priority values such as, for example, proportional fair queuing so that data streams receive a portion of the resources proportional to the priority of the data stream.

History modeling may use the history component that is responsible to build a model of network disruption in order to provide predictions about the duration of an ongoing network disruption. In one aspect, the history component may predict a duration of a disruption as the average of the last "N" disruptions. In other embodiments, cognitive and/or machine learning techniques may be implemented for the historical modeling to improve the accuracy of the predictions. Furthermore, the history component may be missing, and the rate optimizer may assume disruptions of undetermined length. In such a case, the present invention may dynamically halve the data streams production rates every epoch until the disruption is solved (in the spirit of an "exponential back-off" algorithm).

In relation to coordination messages, depending on the various systems, the rate optimizer may determine and/or calculate recommended data stream production rates based on time epochs or reactively when detecting significant changes in the network conditions. In one aspect, the rate optimizer may work in conjunction with the computer system/server 12 (FIG. 1) and may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

The rate optimizer may be responsible to push updated data stream production rates to each of the applications. The rate optimizer may also define the message structure and serialization as an application programming interface ("API"). In one aspect, each of the applications may be required to register with a computer system (e.g., the locality) if the applications intend (e.g., desire) to receive one or more messages and the applications must be able to deserialize and understand the content of the messages. In one aspect, an application administrator may employ a programming model (e.g., a software development kit "SDK") during the implementation of the application. Accordingly, the various types of actions the applications may perform after receiving coordination messages is completely up to applications. In one aspect, the applications may even ignore one or more messages. The message routing component may also ensure that data streams' data rates of the application do not exceed the quota by dropping one or more random messages. In this context, random messages may mean arbitrary data messages (e.g., the rate limiter is free to drop any message produced by the applications that does not abide nor conform to the rate limit imposed or required of each message). In one aspect, "random" may mean that the application has no control in deciding which of its data messages are dropped. Also, the rate limiter does not have to implement a random choice of what messages to drop, but the rate limiter may do so if required.

Figure 6:
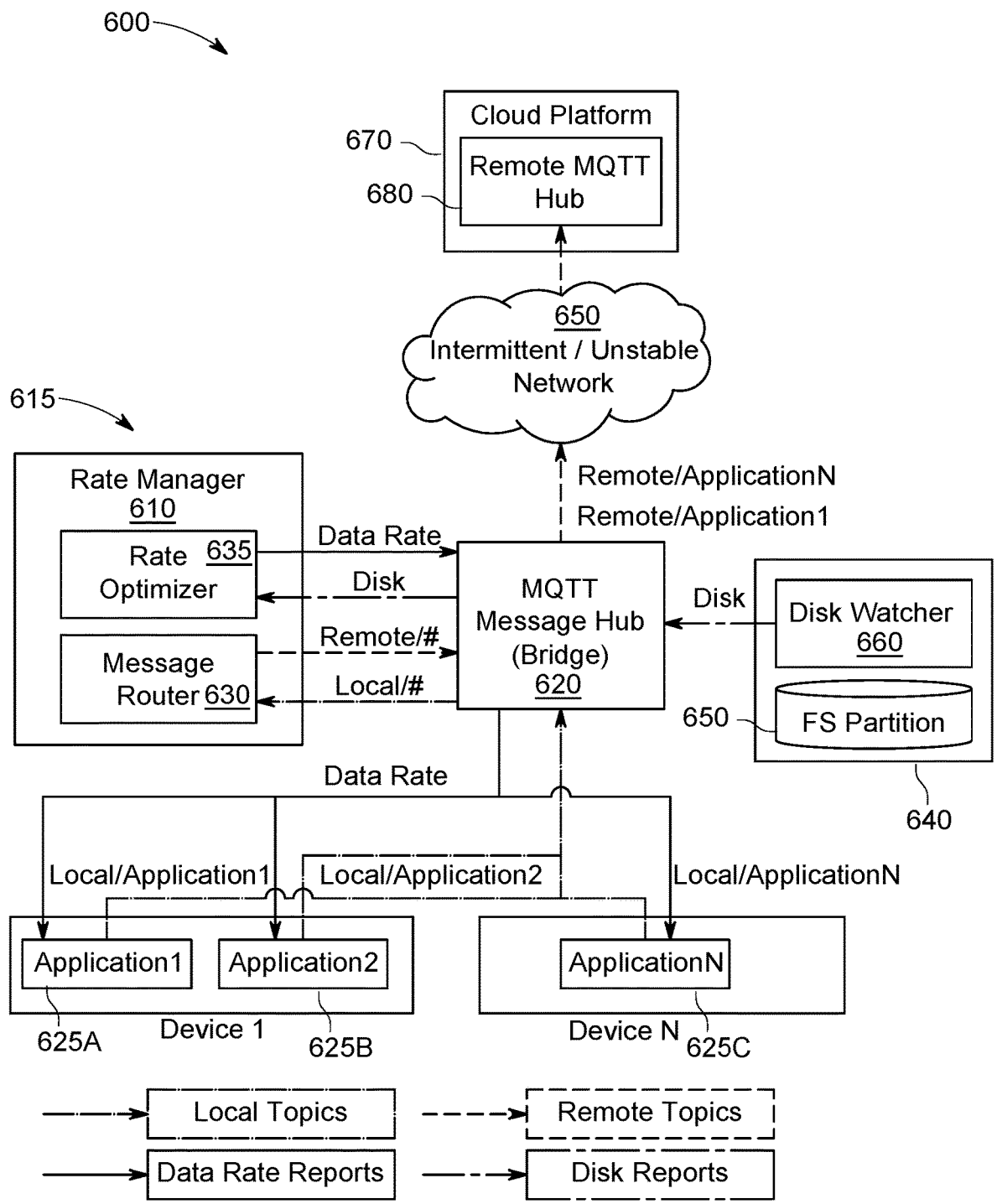
FIG. 6 is an additional block diagram depicting an exemplary system architecture using message queuing telemetry transport (MQTT) in an Internet of Things (IoT) environment according to an embodiment of the present invention.

Turning now to FIG. 6, an additional block diagram depicting an exemplary system architecture 600 using message queuing telemetry transport (MQTT) in an Internet of Things (IoT) environment is depicted. In one aspect, the components, devices, functionality, and/or descriptions of FIGS. 1-5 may be employed in FIG. 6. That is, the system architecture 600 may be a Cloud-Edge/IoT scenario over MQTT. For example, the rate optimizer defined in FIG. 5 may also be employed in FIG. 6.

Accordingly, FIG. 6 includes a rate manager 610 (which includes a rate optimizer 635 and message router 630), a MQTT 620, a storage device 640 (e.g., disk watcher 660 and a file system ("FS") partition 650), and one or more applications 625A-C (e.g., local/applications 1, 2, . . . , N). It should be noted that use of the terms "local" and "remote" as used in FIG. 6 may be used as part of message topic names to limit the visibility of data within the locality where applications run (e.g., local application) and outside the locality (e.g., to other localities or the cloud such as "remote locations"). The MQTT 620 (e.g., the message hub) may cause data to be published to any topic using "local application" to any application within the locality. However, depending on system configurations and one or more rules that may be set, the MQTT 620 (e.g., the message hub) may forward the same data outside the locality on a different topic and this different topic may have a name that is referred to as "remote" (e.g., remote application).

For example, in FIG. 6, "local/application1" is the name of a topic that may be used by Application 1 to publish its data messages within the locality. In the example, the MQTT 620 (e.g., the message hub) is instructed to forward outside the locality the data messages published on "local/application1" 625A to the topic "remote/application1", which is made available outside the locality. The rate limiting and filtering operations may be applied to the messages in "local/application1" topic before being published to "remote/application1" for forwarding. In this way, the present invention provides for building on capabilities of the MQTT 620 (e.g., the message hub) to enable a forwarding scheme and the back pressure operations as illustrated herein. For example, in FIG. 6, the MQTT 620 and the remote MQTT hub 680 (e.g., the message hub) may be used to facilitate message exchanges between applications and between applications and the Cloud. In the MQTT 620 and the remote MQTT hub 680, the messages may be exchanged between the two different locations (one location being the locality, the other being a cloud computing environment such as, for example, cloud platform 670) by having two MQTT message hubs (e.g., the MQTT 620 and the remote MQTT hub 680) talking to each other.

FIG. 6 also includes a cloud platform 670 (which may have a "remote MQTT hub" 680) in communication with the MQTT 620 via a network 655, which may be an intermittent or unstable network. In one aspect, FIG. 6 depicts one or more devices (e.g., devices 1-N that may also be computation processor boards or single-board computers such as, for example, RaspberryPi™ or Nvidia TK1™) that may be deployed in the same Local Area Network (LAN) 615 (e.g., the LAN may include the rate manager 610, the MQTT 620, and/or the disk 640). Each of the devices 1-N may send messages on the LAN 615 using wired or wireless network interfaces. Each of the devices 1-N may host one or more applications 625A-C identified by an Application Identifier ("ID"). A weight may be defined for each application based on the priority. The task of forwarding the messages from the LAN 615 to the cloud platform 670 may be delegated to an instance of the MQTT 620 (e.g., MQTT Broker that may be configured as a bridge). The rate manager 610 may be an agent between each of the applications 625A-C and the cloud platform 670 (which may be a remote cloud platform). The tasks of the rate manager 610 may be partitioned in one or more components or modules. For example, the rate manager 610 may include the message router 630 that may forward packages to the cloud computing environment (e.g., cloud platform 670) performing message dropping in the event quota constraints are not respected.

The rate manager 610 may also include a rate optimizer 635 that may receive information about resources consumed and define the overall data rate required to guarantee the availability of storage and network bandwidth. The rate optimizer 635 may also perform a partition of the overall data production rate based on weights (which may be determined and/or provided by a user). The rate optimizer 635 may also inform each application 625A-C by publishing a message for a specific topic (e.g., a topic of "datarate"). For example, the message for a specific topic may include local topics, data rate reports, remote topics, and/or disk reports. The rate optimizer 635 may monitor (e.g., keep track of) the presumed duration of current and/or subsequent network connectivity outages, interruptions, or disruptions. That is, the rate optimizer 635 may monitor and maintain a history of any network disruptions by continuously updating an internal parameter defined as "durationoutage" using one of a plurality of equations such as, for example, the following equation:

$$\text{durationOutage} = \text{durationOutage}(1-\text{ratio}) + \text{durationLastOutage} * \text{ratio} \quad (1),$$

Where the ratio is a value set by a user and/or administrator that may range from zero (0) to one (1) and may represent how fast the user and/or administrator desires the presumed disruption duration to change based on a new remote connectivity outage (e.g., a defined time period), and durationLastOutage is the time duration of the most recent network outage.

In the event of a network disruption, given the amount of remaining disk resources provided by the local agent 660 (e.g., disk watcher), the rate optimizer 635 may define the necessary bandwidth to ensure or guarantee write operations for an entire length of the presumed duration of the network disruptions. The overall bandwidth may be partitioned between the various applications based on weights that have been determined, assigned, or provided (by a user/administrator) to each of the applications. The weighted values may be a selected value, a percentage, and/or a value within a range of values. The weighted values may be periodically updated and transmitted to the various applications via the MQTT 620. The internet bandwidth may also be similarly partitioned for each of the applications 625A-C.

The rate manager 610 may also include and/or be associated with a storage device/system 640 (e.g., a storage disk that may include an agent and/or file system ("FS") partition) that may be used for preserving off-line messages in a FS partition co-located on the same physical node of the MQTT 620 (e.g., MQTT Message Broker). The disk partition may be monitored by a local agent (e.g., disk watcher) that sends periodical reports to the rate optimizer 635.

Figure 7:
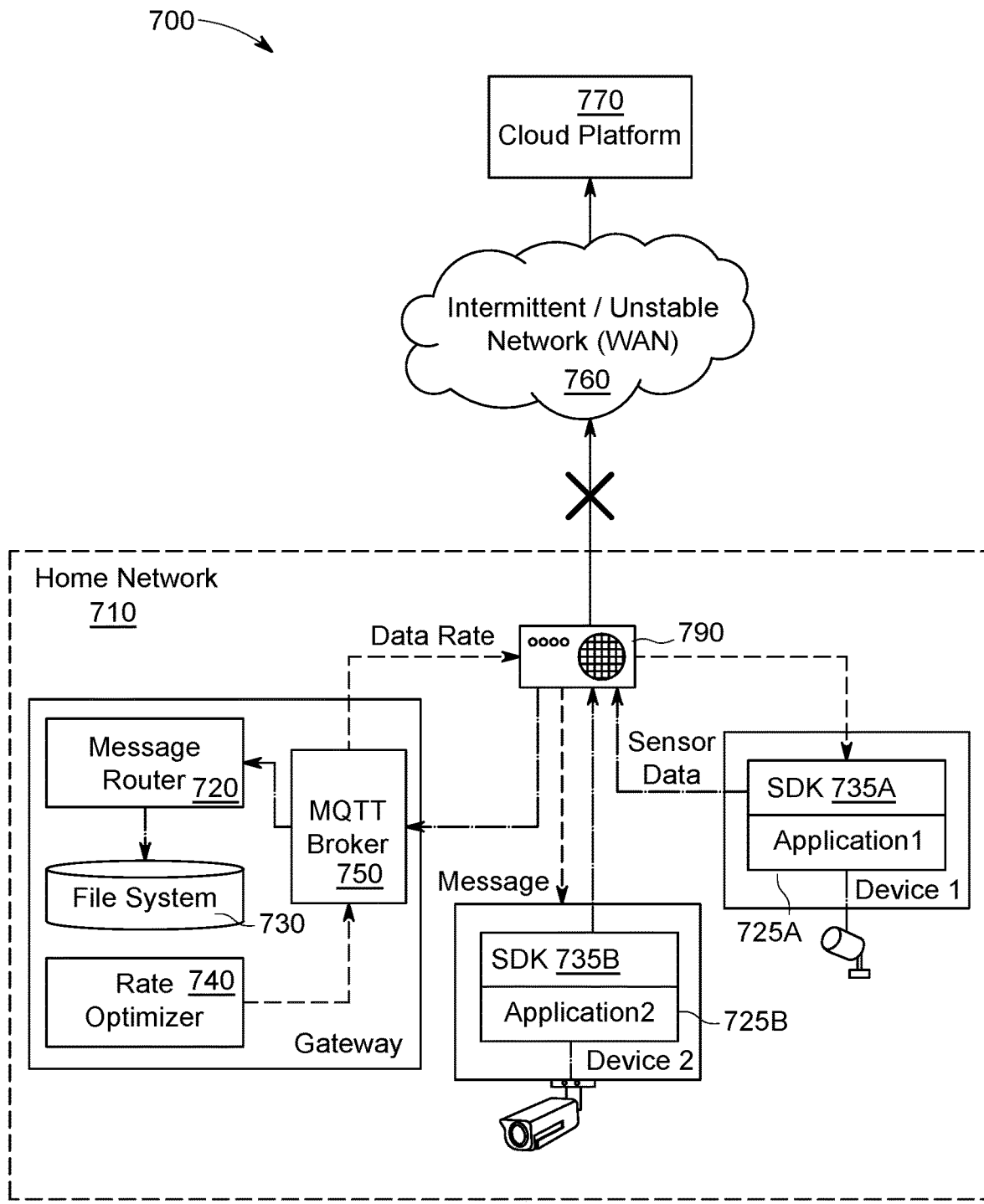
FIG. 7 is an additional block diagram depicting application-level, cooperative minimization of offlining incidents in an Internet of Things (IoT) environment in which aspects of the present invention may be realized.

Turning now to FIG. 7, an additional embodiment of the present invention depicts a block diagram depicting an exemplary system architecture 700 for an application-level, cooperative minimization of offlining incidents in an Internet of Things (IoT) environment such as, for example, in a "smart home." In one aspect, the components, devices, functionality, and/or descriptions of FIGS. 1-6 may be employed in FIG. 7. That is, the system architecture employed and described in FIGS. 4-6 may be employed in system architecture 700. The system architecture 700 may be employed in an IoT environment such as, for example, in a smart home.

As depicted in FIG. 7, one or more devices (e.g., device 1 and/or 2 that may also be computation processor boards or single-board computers such as, for example, RaspberryPi™ or Nvidia TK1™) that may be deployed in the same Local Area Network (LAN) may be connected to a network 710 (e.g., a home network 710). Each device (e.g., devices 1, 2) may be and/or include one or more sensors (e.g., IoT sensor devices) capable of collecting data from the home network 710 environment (e.g., temperature, humidity, video, etc.).

The messages collected in the home network 710 may be forwarded to a remote cloud platform 770 for additional elaboration. A modem/router 795 may be employed that enables the various interactions both inside the home network 710, and/or between the locality (e.g., the home network) and the cloud platform 770 (e.g., WAN). A privileged device 790 called a "Gateway" may be responsible for the management of the devices in the home network and may be the only node of the home network 710 interacting with the remote cloud platform 770. In one aspect, the privileged device 790 may be a device database that stores a list of privileges that are allowed to read from or write to a device. This privileged device 790 provides a mechanism for an administrator to further control access to a device (e.g., devices 1 and/or 2) that can be managed through traditional device access controls.

A message broker 750, which may be hosted on the Gateway 790, may collect the data created in the home network 710 and forward them to the remote cloud platform 770. The MQTT broker 750 may exchange messages based on the publish and/or subscribe pattern. Each device (e.g., devices 1, 2) may periodically collect data from sensors of the devices 725A, 725B and send the data to the message broker 750 as MQTT messages at a specified topic.

In the event of connectivity disruption (e.g., a missing connectivity) of the network 760 with the cloud platform 770 and the home network 710, the message broker 750 may be responsible for storing the messages received from each application on a local filesystem. A rate manager, which may be hosted on the gateway, may define an optimal data transfer rate (e.g., defined for duration of the network disruption) for each application 725A, 725B in the home network 710 based on the local disk usage. Moreover, the rate optimizer 740 may generate and propagate recommended data production rates for each of the data streams of the applications 725A, 725B produced in the home network 710. In one aspect, selected MQTT topics may be reserved to enable the transmission of control messages in the home network. In one aspect, the rate optimizer 740 is responsible for calculating and determining the optimal data production and/or transfer rates for the applications. The rate optimizer 740 may also send those calculated rates to applications.

A message router 720 may be responsible for monitoring the data rates produced by applications and verifying that the data rates are within the limits determined by the rate optimizer 740. If the data rates are not within the limits determined by the rate optimizer 740, the message router 720 may drop one or more application messages so that data rates are again within the limits. It should be noted that use of the term rate manager represents the collective use and name of combining the rate optimizer 740 and the message router 720. Collectively, the rate optimizer 740 and the message router 720 (e.g., collectively referred to herein as a rate manager) provide for the management of application data rates.

In an additional aspect, at fixed or defined time intervals, the rate manager (located on the gateway 790) may update the data transfer rates for each application and spread the information on the reserved MQTT topic datarate. That is, once optimal data rates per application are calculated, the rate manager (e.g., the rate optimizer 740 in conjunction with the message router 720) will make sure that those rates are delivered to the applications running in the locality. The value of the data transfer rate may be determined and/or computed based on the amount of remaining disk space resources. A software development kit ("SDK") 735A, 735B may be provided (on and/or associated with each device such as, for example, device 1 and device 2) and allow the various applications to collect control messages. Each application may use the suggested data production rate to optimize a collection of data during the period of missing connectivity with the backend platform (e.g., the cloud platform). If the application decides to disregard the suggested data production rate and send messages to a higher rate, some of the messages may be dropped by the message router 720 (similar to the message router 630 of FIG. 6 and may perform message dropping in the event quota constraints are not respected). Also, the message router 720 may send to a file system ("FS") 730 partition co-located on the same physical node of the MQTT 750 (e.g., MQTT Message Broker) one or more off-line messages for preserving the one or more off-line messages in the FS. Once the networked connection is restored, the MQTT (e.g., message broker) may upload the saved data to the cloud platform.

Thus, as described herein via FIGS. 1-7, one or more applications are given the opportunity to proactively adapt data production rates of the application according to the current network state. For example, the application may decide how to aggregate data and/or discard less relevant information based on application semantics. That is, each application knows what is the meaning (and value) of the data messages each application produces. Hence, the application may take informed decisions on how to reduce their data rates while limiting the loss of value. For example, a medical application may send to a cloud computing system heart rate readings from one or more heart monitors. In normal conditions (e.g., no system disruptions), the medical application may also send a reading of the heart monitor and sensor. However, when a disruption occurs, the medical application may decide to reduce the data rate by not sending every heart rate reading, but only sending heart rate readings that are over a certain threshold and that are symptoms of a dangerous situation. This is a decision that only the application itself can take because only the application knows the meaning of the data the application it is sending. Hence, because the rate manager does not know the meaning of data, the rate manager provides to each applications the opportunity to take such decisions.

The present invention enriches the awareness of the applications by providing control messages at the application level. As a result, the present invention maintains full compatibility with the underlining network protocols while increasing the resource optimization, especially in the presence of network disruptions. Using a rate limiting component, the present invention provides a solution that guarantees that network disruption minimizes information loss in accordance to application-specific QoS policies.

Figure 8:
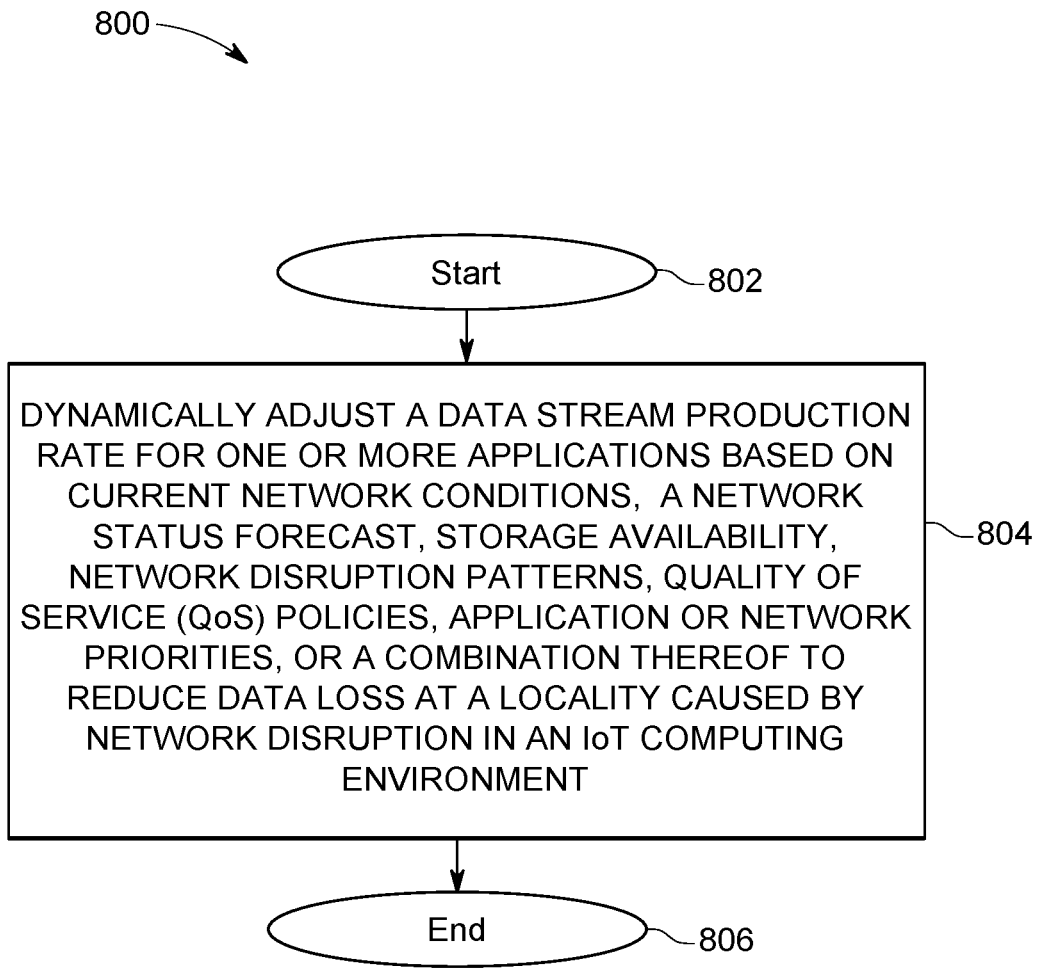
FIG. 8 is a flowchart diagram depicting an exemplary method for application-level, cooperative minimization of offlining incidents in an Internet of Things (IoT) environment in which aspects of the present invention may be realized.

Turning now to FIG. 8, a method 800 for application-level, cooperative minimization of offlining incidents in a computing environment by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802. A data stream production rate for one or more applications may be dynamically adjusted based on current network conditions, a network status forecast, storage availability, network disruption patterns, quality of service (QoS) policies, application or network priorities, or a combination thereof to reduce data loss at a locality caused by network disruption in an IoT computing environment, as in block 804. The functionality 800 may end, as in block 806.

Figure 9:
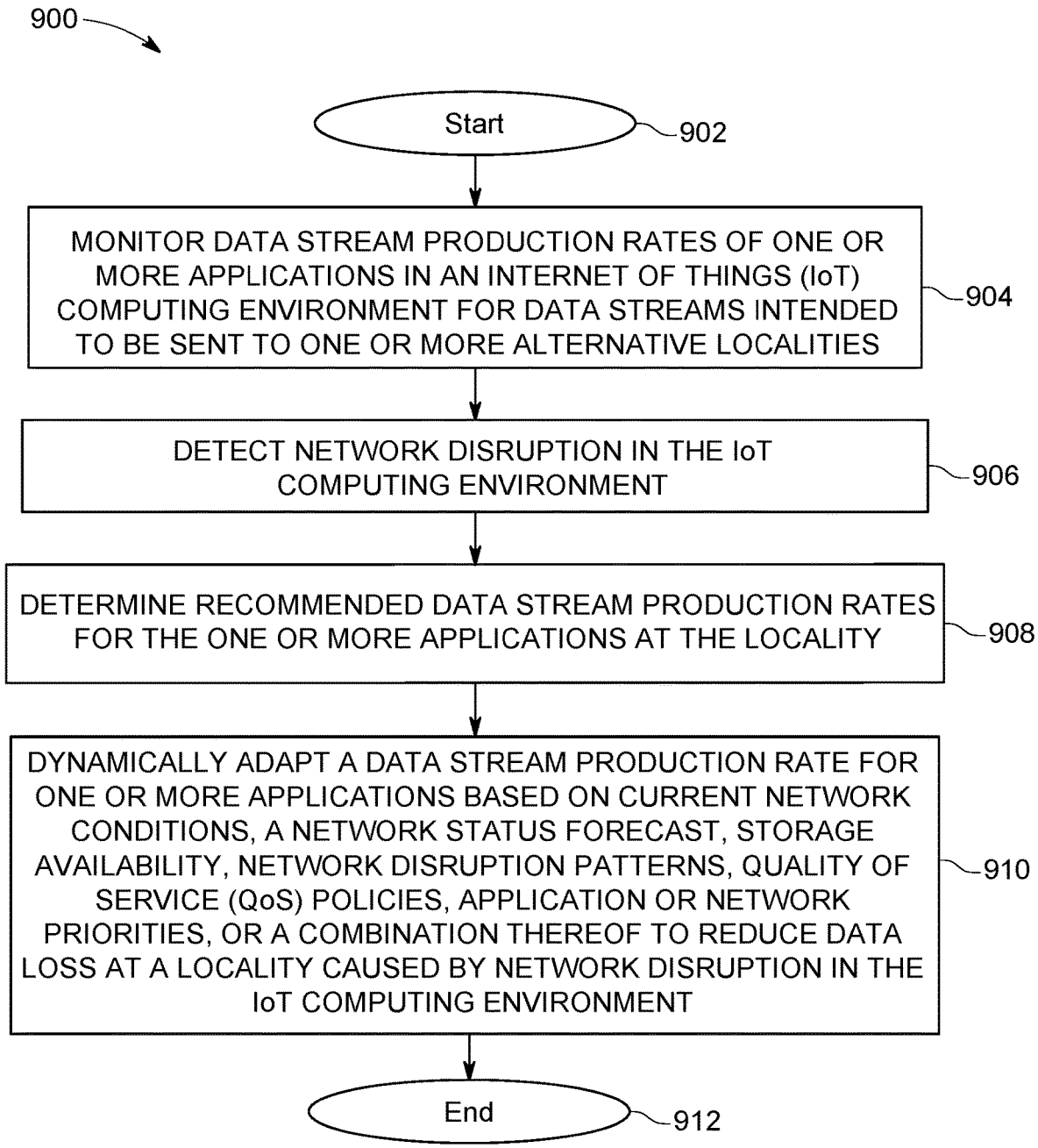
FIG. 9 is an additional flowchart diagram depicting an exemplary method application-level, cooperative minimization of offlining incidents in an Internet of Things (IoT) environment in which aspects of the present invention may be realized.

Turning now to FIG. 9, a method 900 for application-level, cooperative minimization of offlining incidents in a computing environment by a processor is depicted, in which various aspects of the illustrated embodiments may be implemented. The functionality 900 may be implemented as a method executed as instructions on a machine, where the instructions are included on at least one computer readable medium or one non-transitory machine-readable storage medium. The functionality 900 may start in block 902. Data stream production rates of one or more applications in an IoT computing environment for data streams intended to be sent to one or more alternative localities may be monitored, as in block 904. A network disruption in the IoT computing environment may be detected, as in block 906. Recommended data stream production rates for the one or more applications at the locality may be determined, as in block 908. A data stream production rate for one or more applications may be dynamically adapted (e.g., adjusted, modified, updated, or changed) based on current network conditions, a network status forecast, storage availability, network disruption patterns, quality of service (QoS) policies, application or network priorities, or a combination thereof to reduce data loss at a locality caused by network disruption in the IoT computing environment, as in block 910. The functionality 900 may end, as in block 912.

In one aspect, in conjunction with and/or as part of at least one block of FIGS. 8-9, the operations of 800 and/or 900 may include each of the following. The operations of 800 and/or 900 may include monitoring the data stream production rate of the one or more applications in the IoT computing environment for data streams intended to be sent to one or more alternative localities, and/or monitoring network conditions of the IoT computing environment and storage space of one or more storage devices associated with the locality. One or more recommended data stream production rates may be determined or calculated for the one or more applications at the locality.

The operations of 800 and/or 900 may include providing recommended data stream production rates to the one or more applications via one or more control messages and adapting data stream production rates according to the recommended data stream production rates to the one or more applications via one or more control messages. Each data stream from the one or more applications may be routed to an external network, one or more storage devices, or a combination thereof to accommodate a network disruption in the IoT computing environment. A recommended data stream production rate may be enforced by dropping one or more messages from a data stream.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for optimization of storage and network usage in an Internet of Things (IoT) computing environment, comprising:
    receiving input of quality of service (QoS) policies, weighted application priorities, and network priorities for each of a plurality of applications executing on a plurality of devices at a locality of the IoT computing environment, wherein each of the plurality of applications comprise computer programs executing on respective devices of the plurality of devices, and wherein a gateway device at the locality facilitates Internet connectivity between the Internet and the plurality of applications;
    collecting information associated with storage availability at the locality, and current network conditions and a network status forecast for the locality;
    determining a recommended data stream production rate for each of the plurality of applications based on the input and the collected information, wherein a data rate quota is assigned to each of the plurality of applications as an upper bound of the recommended data stream production rate;
    transmitting the recommended data stream production rate and the data rate quota to each of the plurality of applications;
    dynamically adjusting, by each respective application of the plurality of applications, a data stream production rate of the respective application according to the recommended data stream production rate and the data rate quota, wherein a first one of the plurality of applications executing on a first one of the plurality of devices individually adjusts the data stream production rate of data produced thereof irrespective of the data stream production rate of a second one of the plurality of applications executing on the first one of the plurality of devices; and
    enforcing the data rate quota of each of the plurality of applications by dropping one or more messages from a data stream of a non-compliant application of the plurality of applications in response to determining that the data stream production rate of the non-compliant application exceeds the data rate quota, wherein the one or more messages are selected at random by the gateway device.

2. The method of claim 1, further including monitoring the data stream production rate of the plurality of applications in the IoT computing environment for data streams intended to be sent to one or more alternative localities.

3. The method of claim 1, further including monitoring network conditions of the IoT computing environment and storage space of one or more storage devices associated with the locality.

4. The method of claim 1, further including routing a data stream from each of the plurality of applications to an external network, one or more storage devices, or a combination thereof to accommodate a network disruption in the IoT computing environment.

5. A system for optimization of storage and network usage in an Internet of Things (IoT) computing environment, comprising:
    one or more computers with executable instructions that when executed cause the system to:
        receive input of quality of service (QoS) policies, weighted application priorities, and network priorities for each of a plurality of applications executing on a plurality of devices at a locality of the IoT computing environment, wherein each of the plurality of applications comprise computer programs executing on respective devices of the plurality of devices, and wherein a gateway device at the locality facilitates Internet connectivity between the Internet and the plurality of applications;
        collect information associated with storage availability at the locality, and current network conditions and a network status forecast for the locality;
        determine a recommended data stream production rate for each of the plurality of applications based on the input and the collected information, wherein a data rate quota is assigned to each of the plurality of applications as an upper bound of the recommended data stream production rate;
        transmit the recommended data stream production rate and the data rate quota to each of the plurality of applications;
        dynamically adjust, by each respective application of the plurality of applications, a data stream production rate of the respective application according to the recommended data stream production rate and the data rate quota, wherein a first one of the plurality of applications executing on a first one of the plurality of devices individually adjusts the data stream production rate of data produced thereof irrespective of the data stream production rate of a second one of the plurality of applications executing on the first one of the plurality of devices; and enforce the data rate quota of each of the plurality of applications by dropping one or more messages from a data stream of a non-compliant application of the plurality of applications in response to determining that the data stream production rate of the non-compliant application exceeds the data rate quota, wherein the one or more messages are selected at random by the gateway device.

6. The system of claim 5, wherein the executable instructions that when executed cause the system to monitor the data stream production rate of the plurality of applications in the IoT computing environment for data streams intended to be sent to one or more alternative localities.

7. The system of claim 5, wherein the executable instructions that when executed cause the system to monitor network conditions of the IoT computing environment and storage space of one or more storage devices associated with the locality.

8. The system of claim 5, wherein the executable instructions that when executed cause the system to route a data stream from each of the plurality of applications to an external network, one or more storage devices, or a combination thereof to accommodate a network disruption in the IoT computing environment.

9. A computer program product for, by a processor, optimization of storage and network usage in an Internet of Things (IoT) computing environment, the computer program product comprising a non-transitory computer-readable storage medium having computer-readable program code portions stored therein, the computer-readable program code portions comprising:

an executable portion that
receives input of quality of service (QoS) policies, weighted application priorities, and network priorities for each of a plurality of applications executing on a plurality of devices at a locality of the IoT computing environment, wherein each of the plurality of applications comprise computer programs executing on respective devices of the plurality of devices, and wherein a gateway device at the locality facilitates Internet connectivity between the Internet and the plurality of applications;

an executable portion that collects information associated with storage availability at the locality, and current network conditions and a network status forecast for the locality;

an executable portion that determines a recommended data stream production rate for each of the plurality of applications based on the input and the collected information, wherein a data rate quota is assigned to each of the plurality of applications as an upper bound of the recommended data stream production rate;

an executable portion that transmits the recommended data stream production rate and the data rate quota to each of the plurality of applications;

an executable portion that dynamically adjusts, by each respective application of the plurality of applications, a data stream production rate of the respective application according to the recommended data stream production rate and the data rate quota, wherein a first one of the plurality of applications executing on a first one of the plurality of devices individually adjusts the data stream production rate of data produced thereof irrespective of the data stream production rate of a second one of the plurality of applications executing on the first one of the plurality of devices; and an executable portion that enforces the data rate quota of each of the plurality of applications by dropping one or more messages from a data stream of a non-compliant application of the plurality of applications in response to determining that the data stream production rate of the non-compliant application exceeds the data rate quota, wherein the one or more messages are selected at random by the gateway device.

10. The computer program product of claim 9, further including an executable portion that:
monitors the data stream production rate of the plurality of applications in the IoT computing environment for data streams intended to be sent to one or more alternative localities; and
monitors network conditions of the IoT computing environment and storage space of one or more storage devices associated with the locality.

11. The computer program product of claim 9, further including an executable portion that routes a data stream from each of the plurality of applications to an external network, one or more storage devices, or a combination thereof to accommodate a network disruption in the IoT computing environment.

* * * * *